(12) United States Patent
Stadlmayr et al.

(10) Patent No.: US 7,470,065 B2
(45) Date of Patent: Dec. 30, 2008

(54) PLAIN BEARING ELEMENT AND METHOD OF PRODUCING A WRAPPED PLAIN BEARING BUSHING

(75) Inventors: August Stadlmayr, Desselbrunn (DE); Achim Schmidt, Ebsdorfergrund-Wittelsberg (DE)

(73) Assignee: Federal-Mogul Deva GmbH, Stadtallendorf (DE)

( * ) Notice: Subject to any disclaimer, the term of this patent is extended or adjusted under 35 U.S.C. 154(b) by 354 days.

(21) Appl. No.: 11/300,936

(22) Filed: Dec. 15, 2005

(65) Prior Publication Data
US 2006/0177166 A1 Aug. 10, 2006

(30) Foreign Application Priority Data
Dec. 15, 2004 (DE) .................. 10 2004 060 258

(51) Int. Cl.
*F16C 33/02* (2006.01)
(52) U.S. Cl. .................. 384/285; 384/42; 384/284; 384/300
(58) Field of Classification Search .................. 384/42, 384/276, 282–285, 293, 297, 300
See application file for complete search history.

(56) References Cited

U.S. PATENT DOCUMENTS

| | | | | | |
|---|---|---|---|---|---|
| 379,531 | A | * | 3/1888 | Douglas | 384/285 |
| 445,989 | A | * | 2/1891 | Friend | 384/285 |
| 1,422,677 | A | * | 7/1922 | Dann | 384/284 |
| 1,603,470 | A | * | 10/1926 | Johnson et al. | 384/282 |
| 1,743,645 | A | * | 1/1930 | Whiteley | 384/285 |
| 2,490,548 | A | * | 12/1949 | Schultz | 29/898.058 |
| 3,436,129 | A | * | 4/1969 | James | 384/36 |
| 4,323,131 | A | * | 4/1982 | Allee | 175/413 |
| 5,322,372 | A | * | 6/1994 | You | 384/293 |
| 5,462,362 | A | * | 10/1995 | Yuhta et al. | 384/293 |
| 6,896,411 | B2 | * | 5/2005 | Lee | 384/285 |
| 7,118,279 | B2 | * | 10/2006 | Fujita et al. | 384/285 |

FOREIGN PATENT DOCUMENTS

EP 802338 A2 * 10/1997

* cited by examiner

*Primary Examiner*—Thomas R Hannon
(74) *Attorney, Agent, or Firm*—Robert L. Stearns; Dickinson Wright PLLC

(57) ABSTRACT

A method for producing a wrapped bushing, includes cutting a metal blank to size: introducing holes into the blank, each hole being provided with at least one inwardly projecting protrusion: inserting plugs of plastics material exhibiting sliding characteristics into the holes; and shaping the blank to form the bushing. The resultant bushing has a substrate of at least one metal in which the holes are provided and filled with the plastics material. Each hole comprises at least one inwardly projecting protrusion.

13 Claims, 5 Drawing Sheets

PLAIN BEARING ELEMENT AND METHOD OF PRODUCING A WRAPPED PLAIN BEARING BUSHING

This application claims priority to German Patent Application No. 10 2004 060 258.1-14, filed Dec. 15, 2004.

BACKGROUND OF THE INVENTION

1. Technical Field

The invention relates to a method of producing a plain bearing bushing. The invention also relates to a plain bearing element having a substrate material of metal, which comprises holes filled with a plastics material exhibiting sliding characteristics.

Plain bearing elements are in particular plain bearing bushing, thrust washers and flat sliding elements.

2. Related Art

A wrapped, metal/plastics composite bushing is known from EP 0 802 338 B1, production of which starts from a metallic blank containing holes, the blank being formed into a round shape such that the holes are deformed conically towards the center of the bushing. The overlay is then injected into place in an injection molding or transfer molding machine, wherein the holes are filled to anchor the overlay.

On the other hand, bushings are known which are made of thick-walled solid material (e.g. deva glide made by Federal mogul DEVA GmbH). The wall thickness is approx. 5 mm to 60 mm, so that blind bores may be introduced, which are filled with a material exhibiting good sliding characteristics. Such composite material bushings with sliding material plugs are complex to produce, because the bores can only be introduced after manufacture of the bushing blank.

SUMMARY OF THE INVENTION

The invention provides a method with which bushings having plugs exhibiting sliding material characteristics may be produced economically. The invention also provides reasonably priced sliding elements.

The method includes the following steps:
cutting a metal blank to size,
introducing holes into the blank, each hole being provided with at least one inwardly projecting protrusion,
inserting plugs of plastics material exhibiting sliding characteristics into the holes and
shaping the blank to form the bushing.

The inwardly projecting protrusion of metal presses into the softer plastics material when the plug is introduced and holds it captive. Because the plugs are inserted prior to shaping, an additional clamping pressure is exerted on the plugs on bending round to form the bushing due to the resultant hold deformation, this additional clamping pressure providing additional filing for the plugs. A cylindrical hole in the blank, for example, becomes a conical hole on shaping to form the bushing.

The term hole means a through-hole or a blind hole.

For the first time, the method according to the invention makes it possible to produce bushings with holes filled with plastics material which exhibit wall thicknesses of 55 mm.

The protrusion may extend over the entire depth of the hole, which is the case especially when a through-hole has been punched out. However, it is also possible to provide the protrusion at the opening edge of the hole, wherein the protrusion initially extends advantageously over the length of the hole and is then appropriately post-machined. In this case, it is advantageous for the protrusion to be provided at the opening edge of the hole which is on the inside of the finished bushing. On shaping of the blank, this protrusion is force d additionally into the plug material.

The blank is preferably made from a copper alloy. The blank is preferably made from a copper-tin, copper-zinc or copper-aluminum alloy.

Round or polygonal holes are preferably introduced into the blank. Simple geometries are preferred for reasons of manufacturing technology.

The protrusion is advantageously provided with a sharp-edged tip. This simplifies insertion of the plugs, because the protrusion is able to cut into the plug material.

Preferably, therefore, the protrusion is of triangular form.

The flanks of the protrusion are advantageously rounded and merge into the contour of the hole. This has the advantage that complete filling of the hole with plug material is simplified and the plug material rests tight against the hole contour in the area of the protrusion.

The starting material for production of the plugs is preferably a rod of plastics material, for example, the external dimensions of which correspond to the hold dimensions without taking account of the protrusion, wherein slices are cut off this rod to produce the plugs and the plugs are inserted into the holes.

The rods may be produced by extrusion, for example. Cutting may be performed mechanically, for example, by means of sawing, water jet cutting or the like. Another possibility is to press individual plugs with the required geometry on automatic presses, similar to the mass-production of sintered parts.

The plugs may be introduced into the holes in the substrate material manually or in semi- or fully automated manner. To this end, the plugs are positioned over the holes and then pressed or pushed into the holes.

The plugs are preferably cooled to a temperature of below 0° C. prior to insertion and inserted in the cooled state. It is advantageous for the plugs to be supercooled in dry ice or liquid nitrogen and then inserted. In this embodiment, no pressing force is needed to insert the plugs into the holes.

The plugs inserted into the holes preferably have a thickness equal to the wall thickness of the blank, said holes being in this case through-holes.

A preferred material for the plugs is PTFE. Fillers may be incorporated into the PTFE material. Preferred fillers are graphite, $MoS_2$ or $WS_2$. The material should exhibit both a degree of plasticity and also elasticity.

The plain bearing element according to the invention comprises a substrate material of at least one metal, which comprises holes, wherein each hole comprises at least one inwardly projecting protrusion and is filled with a plug inserted therein of plastics material exhibiting sliding characteristics.

The plain bearing bushings may exhibit wall thicknesses of from 0.75 mm to mm with diameters of from 50 mm to 1500 mm.

The holes may be offset relative to one another. The arrangement and number of plugs depends on the field of application. An offset, in particular overlapping, arrangement of the holes and thus of the plugs has the advantage that the plugs come into contact with the largest possible area of the rotating journal during rotation of the bushing.

The holes are preferably round, oval or polygonal.

The protrusion in the hole preferably comprises a sharp-edged tip, wherein the protrusion is preferably triangular in form.

Preferably, the flanks of the protrusion are rounded and merge into the hole contour.

The plugs preferably comprise PTFE, wherein the plugs may also comprise fillers, such as for example $MoS_2$, $WS_2$, or graphite.

The bushings according to the invention are preferably used in hydraulic steel structures, the offshore industry, iron and steel works, heavy machinery, crane and conveying plant, deep and surface mining machinery, and construction and earth-moving machinery.

THE DRAWINGS

Exemplary embodiments of the invention are explained in more detail below with reference to the drawings, in which.

DETAILED DESCRIPTION

Figure 1:
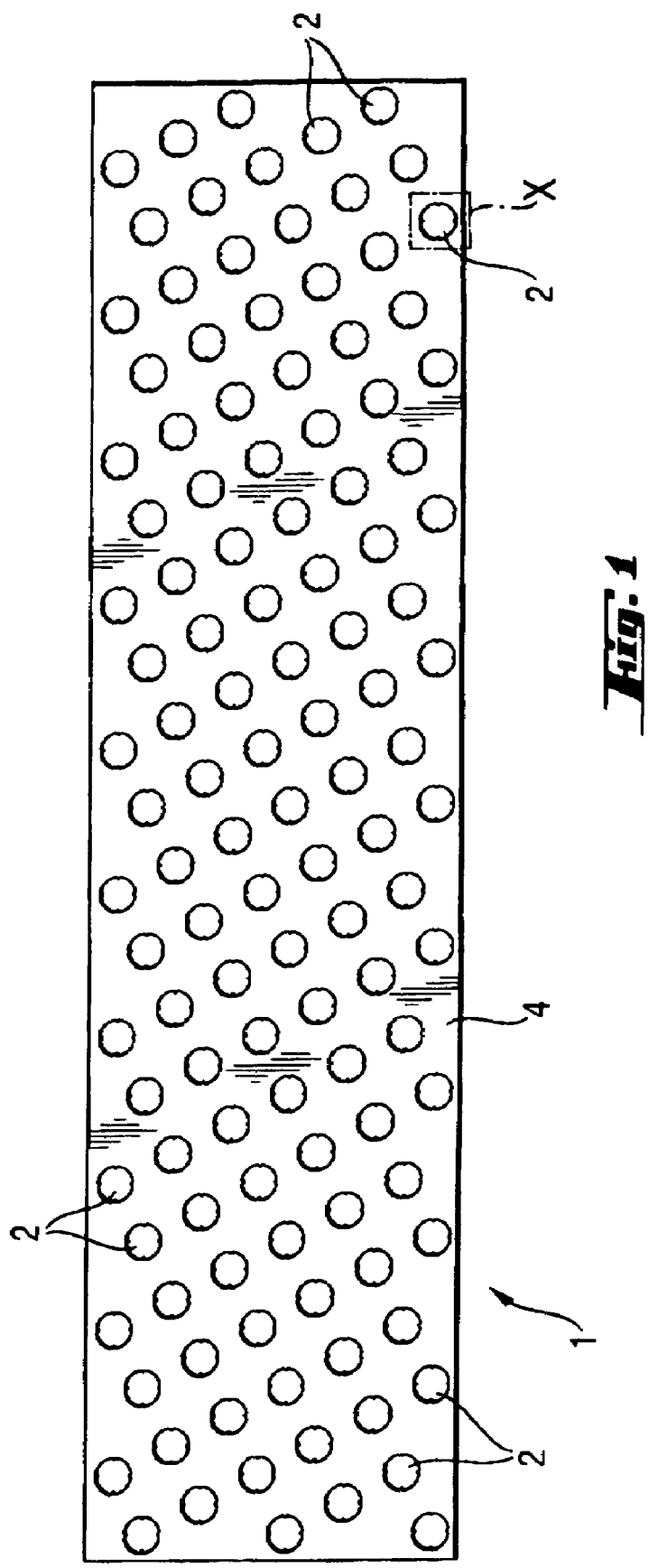
FIG. 1 is a plan view of a perforated blank.

FIG. 1 shows a plan view of a blank 1 made of the substrate material 4. The blank is rectangular, such that a cylindrical bushing may be produced therefrom. The blank comprises holes 2, which are distributed regularly over said blank. The holes are in an offset and overlapping arrangement, wherein the offset in the transverse direction (perpendicular to the longitudinal direction of the blank) is less than half the hole spacing.

The blank 1 and thus the substrate material 4 may consist of the following alloys; CuSn7ZnPb, CuAl10Ni, CuSn12.

Figure 2:
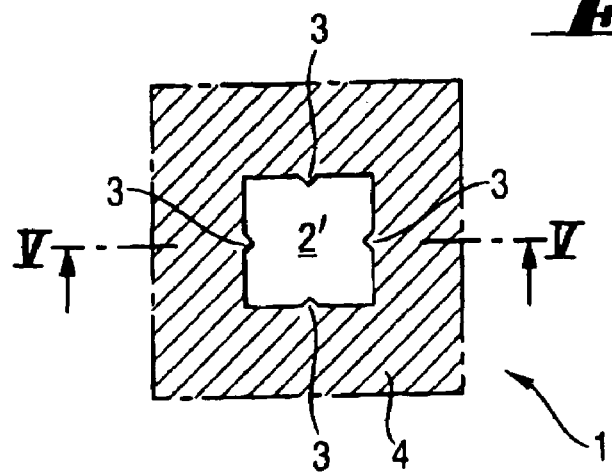
FIGS. 2-4 are enlarged representations of three embodiments of a hole in area X of FIG. 1.
Figure 3:
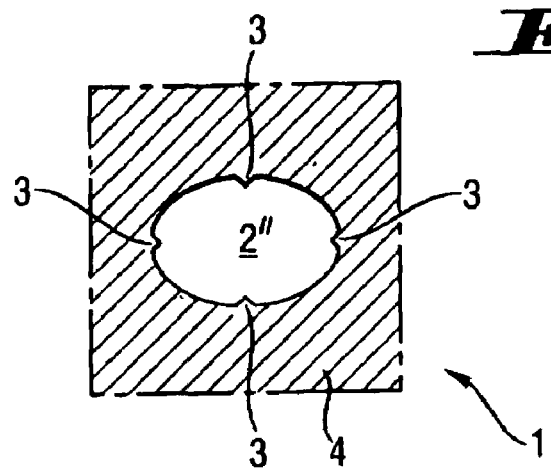
Figure 4:
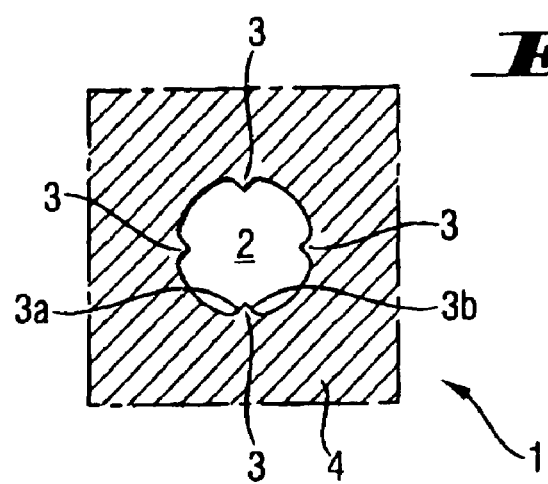

FIGS. 2 to 4 show various hole shapes on an enlarged scale. FIG. 2 shows a square hole 2' with four protrusions 3, wherein a protrusion 3 is arranged on each side face of the hole 2'.

FIG. 3 shows an oval hole 2" likewise with four protrusions 3 distributed evenly around the periphery of the hole.

FIG. 4 shows a round hole 2 likewise with our protrusions 3 distributed evenly around the periphery. In plan view, the protrusions are triangular in form, wherein the flanks 3a,b are rounded and merge into the contour of the hole.

Figure 5:
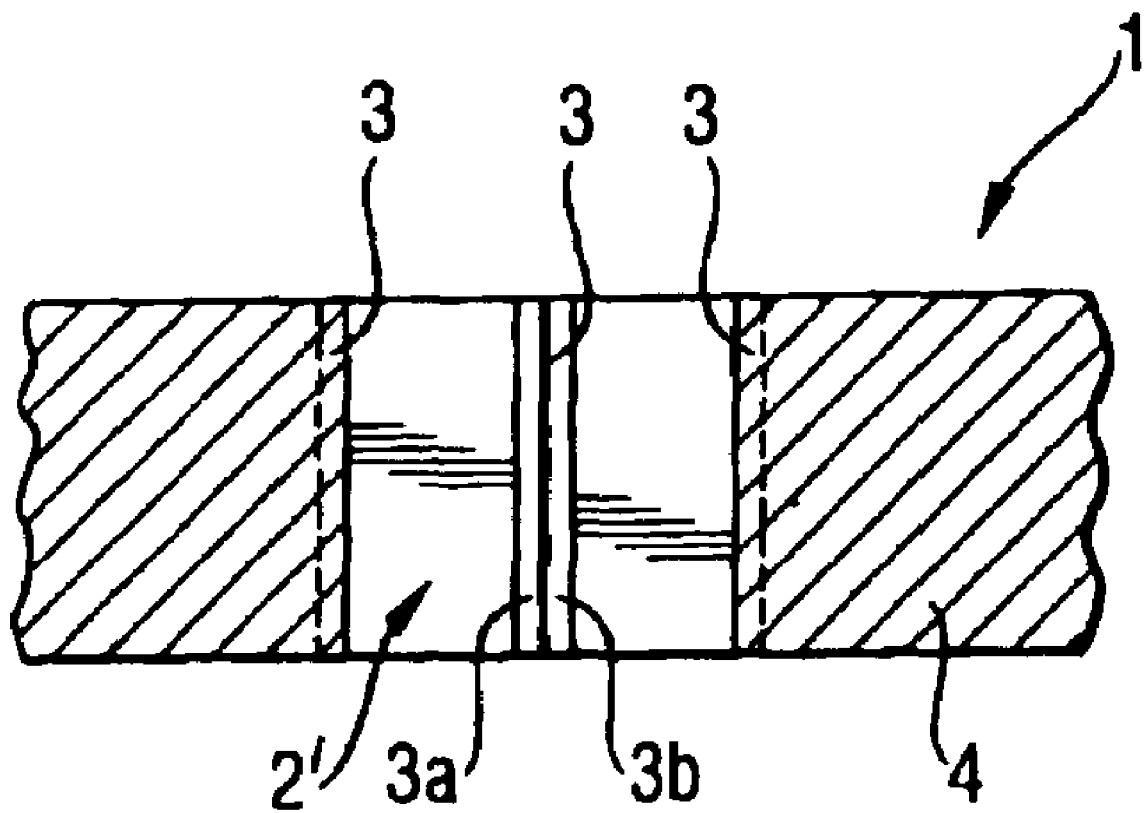
FIG. 5 shows a section along line V-V through the hole contour shown in FIG. 2.

FIG. 5 shows a section through the hole 2' according to FIG. 2 along line V-V. It is clear therefrom that the protrusions 3 extend over the entire depth of the hole. In all cases, the holes are through-holes. Blind holes are also possible.

Figure 6:
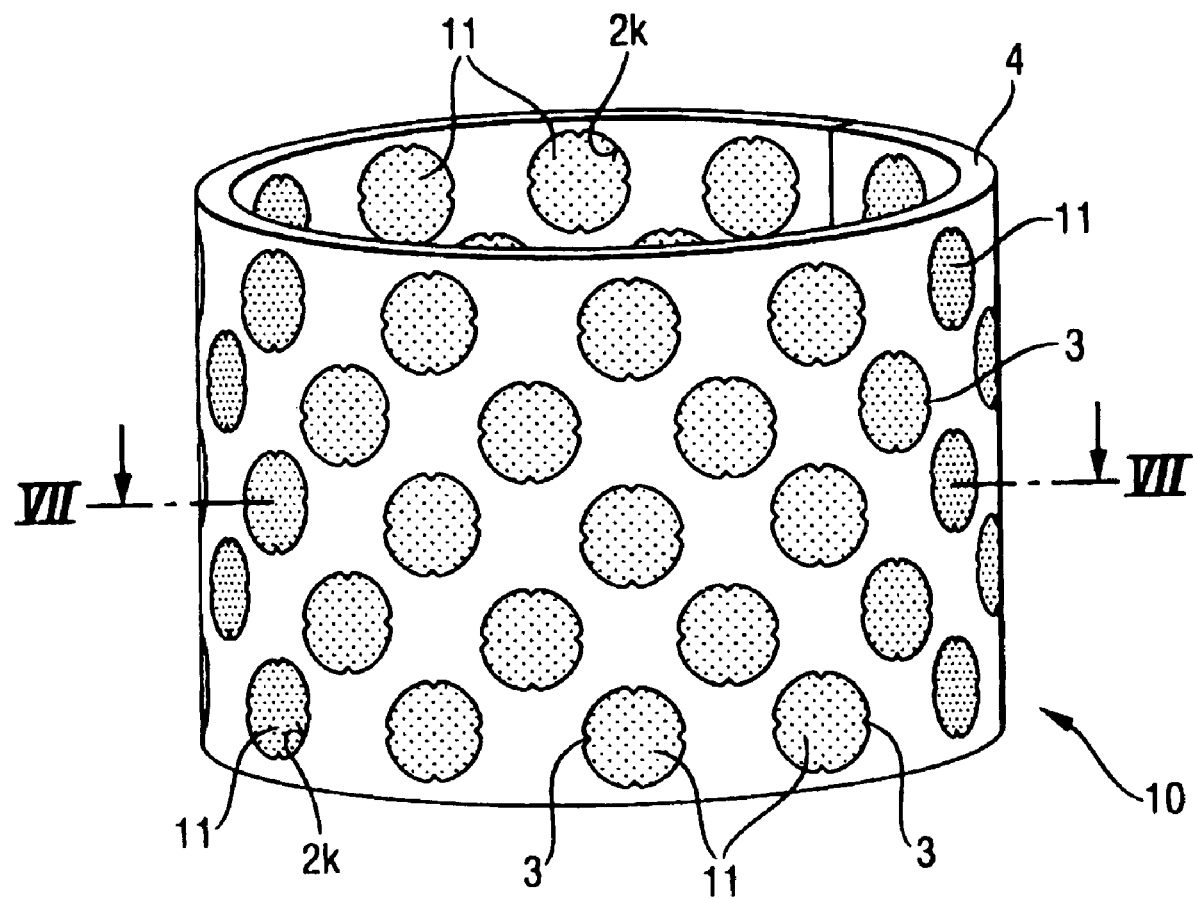
FIG. 6 is a perspective view of a wrapped bushing.

FIG. 6 shows a wrapped bushing 10 with plugs 11 in the holes 2. The arrangement herein is also offset.

Figure 7:
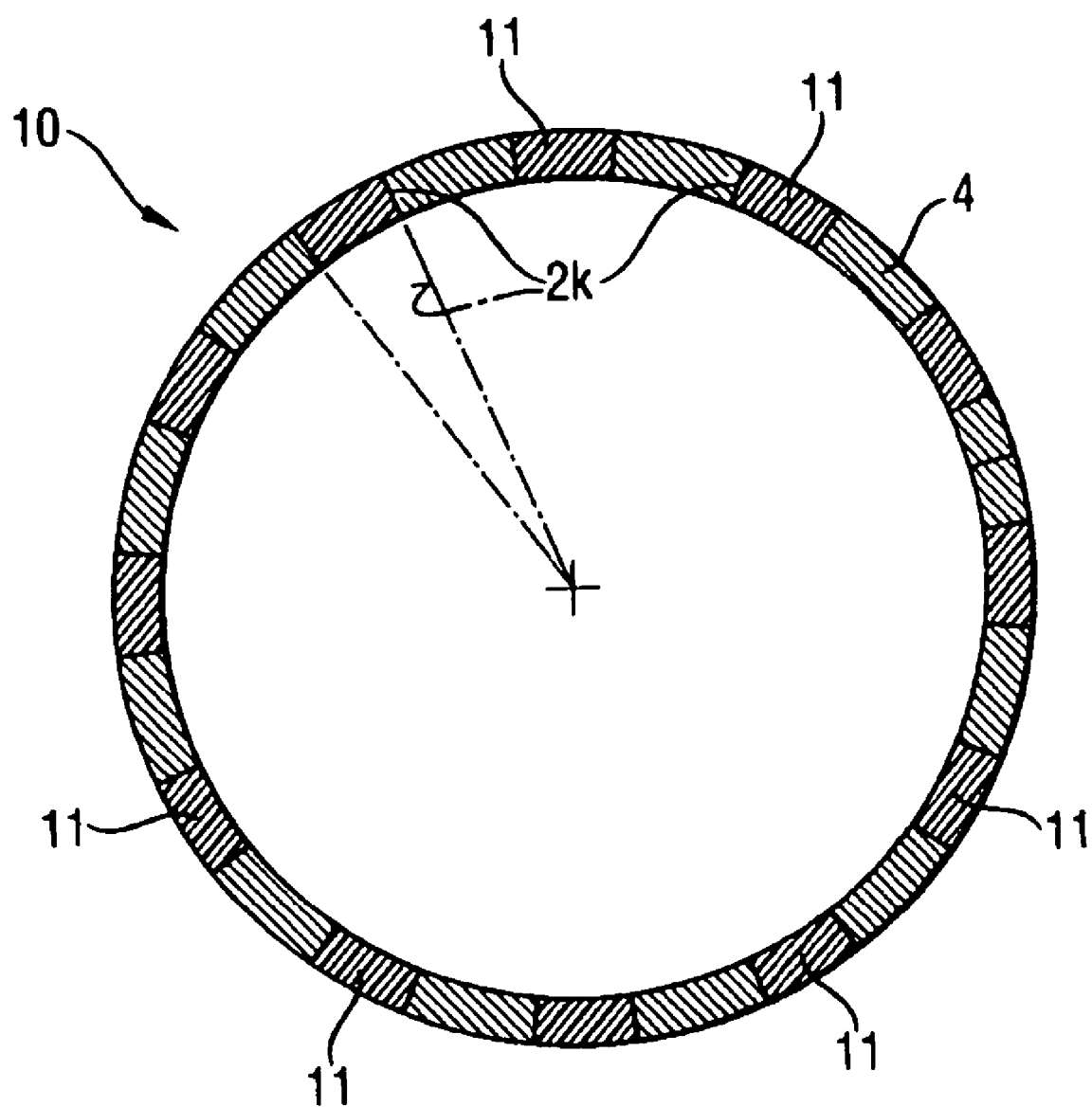
FIG. 7 shows a section along line VII-VII through the bushing shown in FIG. 6.

FIG. 7 shows a section along line VII-VII through the bushing 10 illustrated in FIG. 6. It is clear that substantially conical holes 2k have resulted from the originally cylindrical holes 2 in the blank according to FIG. 1. Due to shaping of the bushing 10 and the reduction of its inner circumference, compression of the plugs 11 located I the holes is achieved as a result of production of these conical holes.

The additionally present protrusions 3 ensure that the plugs 11 are held securely in the bushing 10.

What is claimed is:

1. A plain bearing element comprising:
   a substrate of at least one metal having a plurality of holes;
   at least one radially inwardly projecting protrusion extending axially along the length of the hole; and
   a plug inserted in each of the holes, the plug being of plastics material and exhibiting sliding characteristics and being compressed by the at least one radially inwardly projecting protrusion.

2. The plain bearing clement as claimed in claim 1, wherein the holes are arranged offset relative to one another.

3. The plain bearing element as claimed in claim 1, wherein the holes have a shape selected form either round, oval or rectangular.

4. The plain bearing element of claim 1, wherein the substrate material consists of a copper alloy.

5. The plain bearing clement of claim 1, wherein the substrate material consists of a copper-tin or copper-aluminum alloy.

6. The plain bearing element of claim 1, wherein the protrusion comprises a sharp-edged tip.

7. The plain bearing element of claim 1, wherein the protrusion is triangular in form.

8. The plain bearing element of claim 1, wherein the flanks of the protrusion are rounded and merge into the contour of the hole.

9. The plain bearing element of claim 1, wherein the plugs consist of PTFE or comprise PTFE.

10. The plain bearing element of claim 1, wherein the plugs consist of PTFE with fillers.

11. The plain bearing element of claim 1, wherein the plug consists of PTFE with graphite, $MoS_2$ or $WS_2$ fillers.

12. A plain bearing element of claim 1, having a wall thickness of from 0.75 mm to 5 mm and with diameters of from 50 mm to 1500 mm.

13. A plain bearing element comprising:
   a substrate of at least one metal having a plurality of holes extending axially between first and seconds ends;
   at least one radially inwardly projecting protrusion extending axially between the first and second ends of the hole; and
   a rod of plastics material being inserted in each of the holes and exhibiting sliding characteristics, and wherein said at least one radially inwardly projecting protrusion compresses said rod to secure said rod in said hole.

* * * * *